Patented Aug. 28, 1923.

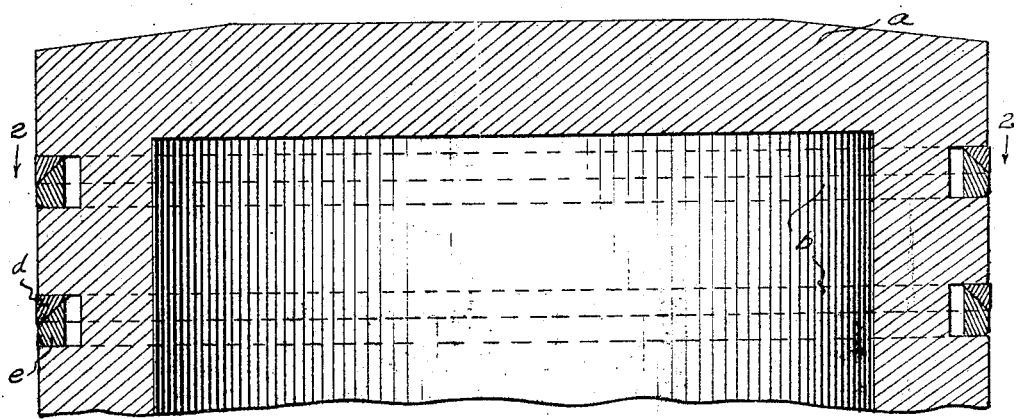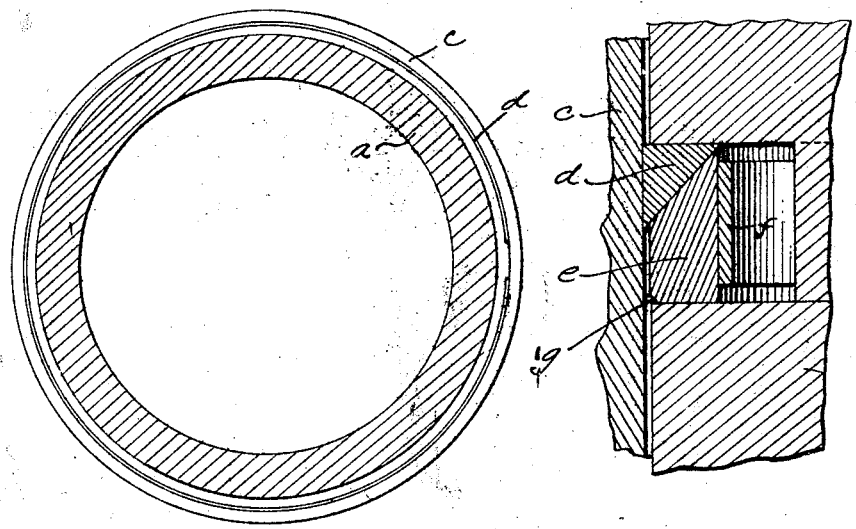
Fig. 1
Fig. 2
Fig. 3
INVENTOR.
ALFRED A. PANYARD
BY
ATTORNEY.

1,466,558

UNITED STATES PATENT OFFICE.

ALFRED A. PANYARD, OF DETROIT, MICHIGAN.

PISTON RING.

Application filed December 23, 1920. Serial No. 432,694.

*To all whom it may concern:*

Be it known that I, ALFRED A. PANYARD, a citizen of the United States, residing at Detroit, county of Wayne, State of Michigan, have invented a certain new and useful Improvement in Piston Rings, and declare the following to be a full, clear, and exact description of the same, such as will enable others skilled in the art to which it pertains to make and use the same, reference being had to the accompanying drawings, which form a part of this specification.

My invention relates to piston rings. The object is to provide a piston ring of simple inexpensive construction adapted to form a close fitting gas tight joint between the cylinder wall and a reciprocating piston. More particularly the object is to provide in combination with a piston having a peripheral groove which groove is ordinarily rectangular in cross section, a resilient packing ring adapted to be received in said groove, which ring is formed in two concentric sections having oblique meeting faces and being of such size that when constricted within the groove the separate ring sections are wedged laterally against the side walls of the groove.

The object is to provide a piston ring which will not only fit snugly against the cylinder wall but will be held so closely against the side walls of the groove of the piston as to prevent any leakage around the ring adjacent the piston. In practice it has been found that with rings constructed as herein described, the ring sections hug the side walls of the groove so securely as to turn with the piston if the piston is rotated within the cylinder. The contrary is ordinarily the case in packing rings used with internal combustion engine pistons which is that construction for which the present ring is peculiarly adapted to be employed.

Figure 1 is an elevation of a portion of a piston head.
Fig. 2 is a cross-section taken on line 2—2. Fig. 1.

Fig. 3 is a vertical section showing the position of the piston ring in the groove in the piston.
Let *a* represent a piston provided with piston ring grooves *b*, two of which are shown in the drawing in Fig. 1. This piston is disposed for reciprocation within a cylinder, not shown in the drawing, but a broken away section of the wall of which is indicated as C in Fig. 3, *c*, in Figs. 3, 4 and 5.

I provide a piston ring formed in two longitudinal sections with beveled contacting surfaces which sections are adapted to be received within the groove *b* in the piston. The separate sections of the ring are indicated as *d* and *e*. The larger section *e* is adapted to be removably received within the groove in the piston, but the inner face is of approximately the same width as the bottom of the groove. The beveled face of the larger section is engaged with the beveled face of the smaller section *d* when the section *d* is forced into position within the groove. Section *d* is a wedge-shaped section of such size that as it is forced into position within the piston ring groove it wedges the sections of the ring sideways against the side walls of the groove thereby securely wedging the ring into place. It will be seen that the cross-sectional area of the wedge-shaped section *d* is larger than the cross-sectional area of the portion which would have to be removed from the section *e* to form its beveled side were such section constructed from a rectangular ring whose longest side was equal to the longest side of section *e*, and it will be observed that this constriction of the wedge-shaped section *d* would be accomplished by the pressure of the cylinder wall against the piston ring when the piston is operating within the cylinder. When the piston is first inserted within the cylinder the outer face of the ring section *d* would project outwardly beyond the face of section *e*. It is only after considerable wear and when section *d* is more completely constricted within the groove that the outer faces of the ring sections are brought flush with each other. The normal working position is that shown in Fig. 3. The principal feature of the invention lies in the provision of these concentric resilient ring sections provided with means for being held yieldingly outwards and having oblique meeting faces and being of such size that when constricted within the piston groove they wedge laterally against the side walls thereof so as to form a close fitting joint between the side walls of the groove and the upright sides of the ring sections.

As shown in Fig. 1 the ring sections are formed of spring metal of such character that the constriction of the sections is against the tension of the material of which they are composed. In Fig. 3 the separate ring sections are shown as being held outwardly by means of the spring $f$, which is interposed in the bottom of the groove below the large ring section. In this construction the rings would be held outwardly by such spring. However, the same result would be accomplished with the construction such as shown in Fig. 1, in which the rings are inherently expansible.

I also provide a lubricating groove $g$ which is formed by beveling the lower outer corner of the section $c$ of the piston ring as shown in Fig. 3. This would form an oil seal adapted to lubricate the interior of the cylinder.

What I claim is:

1. A piston packing comprising a pair of expansible rings of substantially different cross sectional area having conical meeting faces, the ring of larger area having an inner periphery of substantially the width of the groove in which the composite ring is to be used and the aggregate axial width of the two rings at their outer peripheries being greater than the axial width of such groove and when initially installed the ring of relatively lesser area projects beyond the periphery of the outer ring.

2. In combination with a cylinder, a piston having a peripheral packing ring groove and a resilient expansible packing ring for said groove, said packing ring comprising an inner split ring seated within and substantially filling the groove and having the upper edge of its outer peripheral surface beveled outwardly and downwardly so as to form a triangular gap between the beveled portion and the upper side wall of the groove and an outer ring member generally triangular in cross section, of substantially smaller area than the inner ring member but greater than the said triangular gap, said outer ring having a side in sliding engagement with the bevelled edge of the inner ring and a cylinder bearing surface extending beyond the cylinder bearing surface of the inner ring whereby said triangular ring only initially engages the cylinder wall.

3. In piston packing, the combination with a cylinder and a piston having a groove for packing, of packing in said groove comprising an inner expansible ring seated within the groove having its outer periphery beveled outwardly and downwardly to form a gap between such beveled portion and the opposite side wall of the groove, an outer ring member shaped to fit said gap and of substantially smaller area than the inner ring member but larger than said gap, whereby when seated therein it projects beyond the outer periphery of said inner ring member to engage the cylinder wall during the initial period of use to the exclusion of the inner ring member, but adapted to wear within a limited period of use so that both ring members engage the cylinder wall.

In testimony whereof I sign this specification.

ALFRED A. PANYARD.